United States Patent [19]

Bruntz

[11] Patent Number: 4,926,989
[45] Date of Patent: May 22, 1990

[54] ENCLOSED DRY CLUTCH/BRAKE

[75] Inventor: Rodney D. Bruntz, Valley Center, Kans.

[73] Assignee: The Carlson Company, Inc., Wichita, Kans.

[21] Appl. No.: 383,369

[22] Filed: Jul. 21, 1989

Related U.S. Application Data

[63] Continuation-in-part of Ser. No. 185,552, Apr. 25, 1988, abandoned.

[51] Int. Cl.$^5$ .............................................. F16D 67/02
[52] U.S. Cl. .............................. 192/18 A; 192/85 CA
[58] Field of Search .......................... 192/18 A, 85 CA

[56] References Cited

U.S. PATENT DOCUMENTS

| | | | |
|---|---|---|---|
| 2,159,326 | 5/1939 | Harwood et al. | 192/18 A |
| 2,213,111 | 8/1940 | Strout | 192/18 A |
| 2,252,906 | 8/1941 | Williamson | 192/18 A |
| 3,638,773 | 2/1972 | Lewis et al. | 192/18 A |
| 3,667,581 | 6/1972 | Hanks | 192/18.1 |
| 3,696,898 | 10/1972 | Sommer | 192/18 A |
| 3,924,715 | 12/1975 | Cory | 192/18 A |
| 4,122,926 | 10/1978 | Spanke et al. | 192/18 A |
| 4,183,425 | 1/1980 | Sommer | 192/113 B |
| 4,534,454 | 8/1985 | Brooks | 192/18 A |
| 4,607,736 | 8/1986 | Kelley | 192/18 A |
| 4,750,595 | 6/1988 | Dayen et al. | 192/18 A |
| 4,766,986 | 8/1988 | Dayen et al. | 192/18 A |

Primary Examiner—Rodney H. Bonck
Assistant Examiner—Nicholas Whitelaw
Attorney, Agent, or Firm—Kokjer, Kircher, Bradley, Wharton, Bowman & Johnson

[57] ABSTRACT

A combined clutch/brake unit which is enclosed and constructed to avoid heat generation. An enclosed housing supports a driven input hub which carries clutch plates that sandwich a friction line clutch disk. The clutch disk is carried on a rotor which is splined to the output shaft and which also carries a friction lined brake disk. A double acting piston acts in one direction to apply the clutch and in the other direction to apply the brake. The unit may be either air applied clutch/air applied brake or air applied clutch/spring applied brake. The clutch and brake disks are small diameter to minimize the inertia of the output shaft and make it easier to accelerate and stop so that heat generation is minimized. Double friction linings are applied to both disks so that adequate torque is provided for both clutch and brake operation.

18 Claims, 1 Drawing Sheet

4,926,989

ENCLOSED DRY CLUTCH/BRAKE

RELATED APPLICATIONS

This is a continuation in part of my co-pending application, Ser. No. 185,552 now abandoned, now filed on Apr. 25, 1988 and entitled "Clutch/Brake".

BACKGROUND OF THE INVENTION

This invention relates generally to clutch/brake mechanisms and more particularly to an enclosed clutch/brake unit which is specially constructed to minimize heat generation in order to avoid the adverse thermal effects that plague other enclosed units.

Combination clutch/brake units are used in a wide variety of applications, including many applications where it is highly desirable or even essential that the unit be enclosed. The clutch/brake unit includes friction linings on the clutch and brake disks, and it is necessary for the friction linings to be protected from grease and other materials that detract from their frictional capabilities. Units of this kind are commonly referred to as "dry" units as opposed to units which employ a cooling liquid in the housing. Consequently, in an operating environment where the clutch/brake unit is exposed to materials that can adversely effect the friction linings, the unit should be enclosed because the friction reducing materials can create operating problems until they are burned off or otherwise removed. For example, when used in food handling equipment which must be regularly washed for removal of food residues, the clutch/brake unit is exposed to greasy materials that can seriously detract from the ability of the friction linings to function properly. Thus, clutch/brake units that operate in this type of environment must be enclosed in order to properly function in a consistent manner.

When the brake is applied or the clutch is engaged, the pressure on the friction linings causes them to wear away. The dust that is thus generated during operation of the clutch-brake can contaminate the surrounding areas if it is allowed to escape from the unit. Therefore, in applications such as food handling or food processing and in other situations where contamination is intolerable, an enclosed clutch/brake unit is required since the dust that is generated must be adequately contained.

In these and other operating environments, enclosed clutch/brake units are highly desirable and in some cases are absolutely required. However, enclosed units are subject to problems that are not encountered by open units, most notably thermal problems. Considerable heat is generated when the brake is applied or the clutch is engaged and the friction linings slip with respect to the brake or clutch plates. Clutch slippage occurs each time the components are accelerated to operating speed and brake slippage occurs when they are stopped. These slippages create heat due to the effects of friction, and the heat is a particular problem in cyclical, start-stop process controllers which may cycle on and off 30-60 times per minute.

Open units can handle the thermal problems without great difficulty because cooling air can be passed through the unit and over the internal components to dissipate the heat. Usually, the rotor and clutch plates of an open unit are large diameter parts so that the torque capacity is high. Single friction surfaces and fin structures are common to provide a high heat dissipation capacity. However, an enclosed unit does not allow flow through it for dissipation of the heat, and thermal problems are much more prevalent in enclosed units than in open units.

When the brake and clutch disks are formed as separate parts, the brake disk is not loaded when the clutch is engaged. Consequently, backlash created by the fit of the spline teeth for the brake disk can result in rattling of the brake disk and the generation of objectionable noise during operation. Additional noise can be caused by unwanted contact of the brake disk when the clutch is engaged and contact of the clutch disk when the brake is engaged. Undue wear on the friction linings of the disks also results from this drawback in prior units.

SUMMARY OF THE INVENTION

The present invention is directed to an enclosed clutch/brake unit which exhibits the benefits of an enclosed unit and at the same time avoids the generation of excessive heat. In accordance with the invention, a combined clutch-brake unit is constructed with both the brake disk and the clutch disk carried on the output shaft. The disks are small diameter components to minimize the amount of heat generated when starting or stopping the output shaft. The amount of heat that is generated is in large part determined by the diameter of the disks. However, the torque capacity of the clutch and brake is also diameter dependent. To compensate for the small diameter, the clutch and brake disks are both equipped with friction linings on both faces which doubles the torque capacity. The clutch and brake are controlled by a single double acting piston which eliminates the possibility of any overlap in the clutch and brake activation and thus eliminates heat generation from this source.

Mounting of the clutch disk on the output shaft allows the relatively large and massive clutch plates to be mounted on the input hub of the clutch/brake unit. As a consequence, the output shaft exhibits reduced inertia and can be accelerated to speed and stopped with less slippage than occurs in units having greater output shaft inertia. The reduction in slippage increases the friction lining life and, perhaps more importantly, reduces the heat buildup and allows the unit to be enclosed without creating thermal problems that adversely affect its functional capabilities. Although this construction requires that the clutch bearings rotate with the input hub, clutch bearings having non-contact seals can be used to minimize the heat generated by the bearings.

It is a particularly important feature of the invention that the clutch and brake disks are combined to form a one piece rotor and yet each disc has friction lining on two opposing surfaces. As a result, high torque capacity is obtained and there is no objectionable noise generated by backlash in the brake disk splines, as can occur when the brake and clutch disks are separate disconnected parts. Moreover, positive disengagement of the brake is assured when the clutch is engaged and positive disengagement of the clutch is assured when the brake is applied. Another advantage of this arrangement is that it allows lengthy splines to be used to mount the rotor on the output shaft of the unit, and the stress on the splines is reduced because the forces are distributed over an extended length.

In addition to the foregoing advantages, the clutch-brake of the present invention has a nema C-face construction to facilitate installation. The unit is equally well suited for air applied clutch/air applied brake or air applied clutch spring applied brake operation.

DETAILED DESCRIPTION OF THE INVENTION

Figure 2:
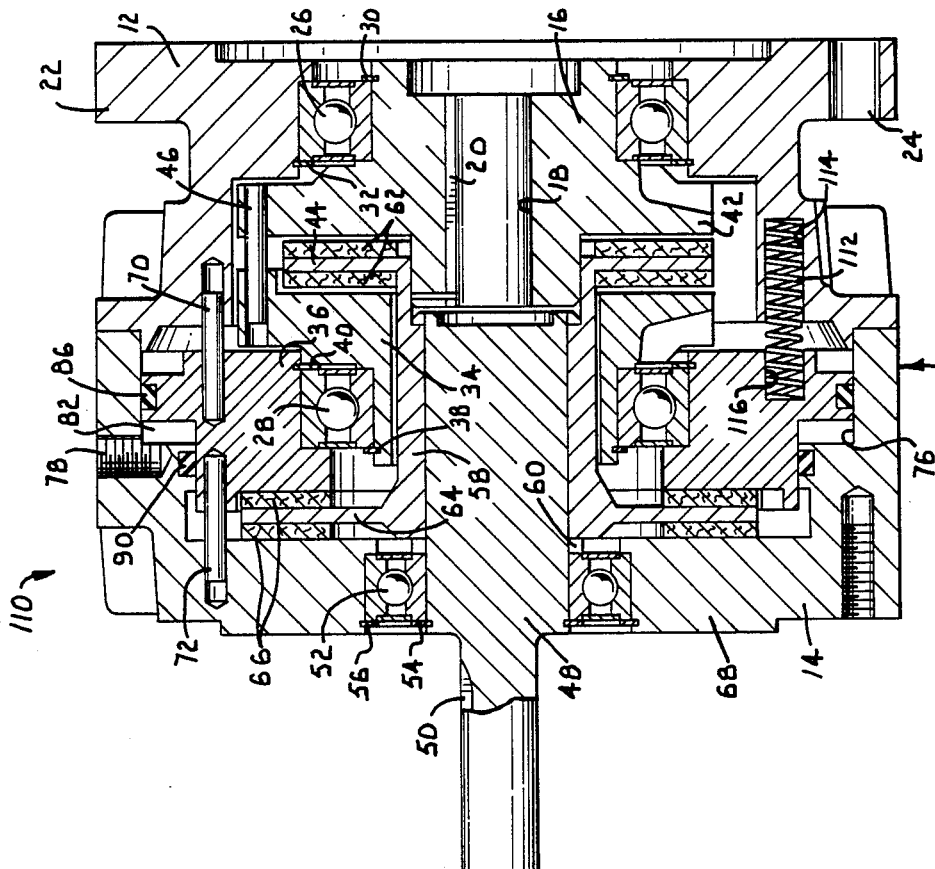
Figure 1:
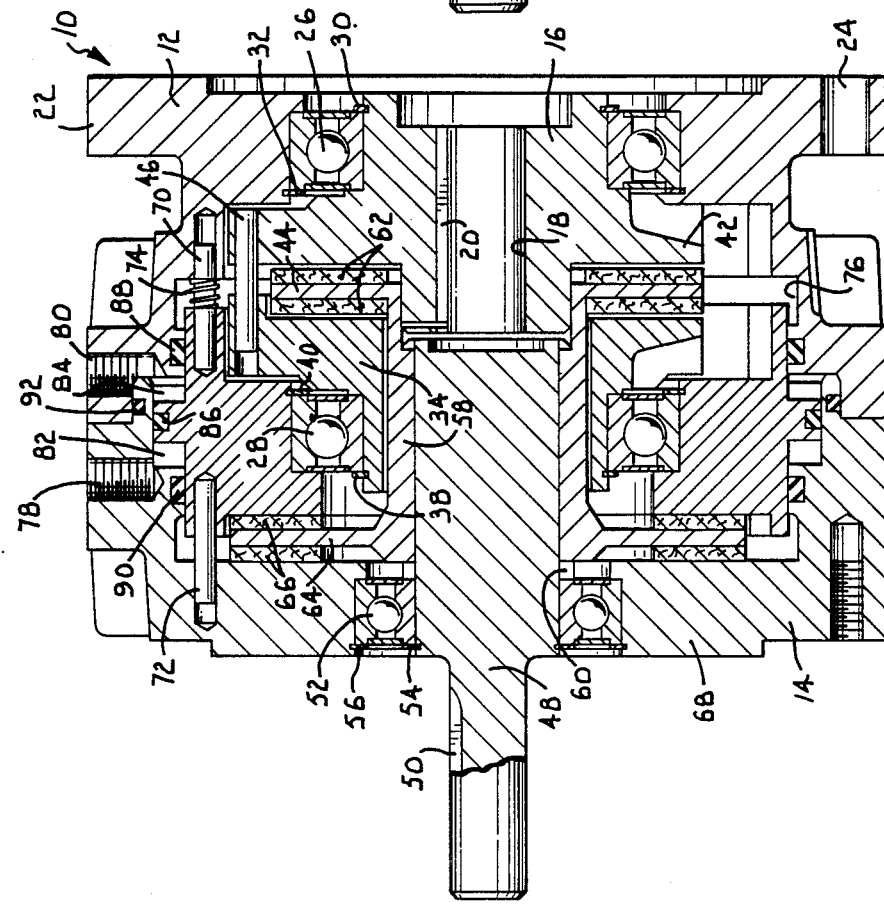

In the accompanying drawing which forms a part of the specification and is to be read in conjunction therewith and in which like reference numerals are used to indicate like parts in the various views:

FIG. 1 is a sectional view taken through a clutch/brake unit constructed according to one embodiment of the present invention; and FIG. 2 is a sectional view of a clutch/brake unit constructed according to a second embodiment of the invention.

Referring now to the drawing in more detail and initially to FIG. 1, numeral 10 generally designates a clutch/brake unit constructed in accordance with the present invention. The clutch/brake unit 10 has a stationary housing 11 formed by a clutch housing 12 and a brake housing 14 which are connected together. Housing 11 is an enclosed housing. The clutch/brake unit 10 has a nema C-face construction and includes an input hub 16 which is located within the clutch housing 12 and is supported for rotation therein. The input hub 16 has a central passage 18 which is splined at 20 in order to mate with the splines on a drive shaft (not shown) of a prime mover such as an electric motor or speed reducer. The clutch housing 12 has a peripheral flange 22 on the input end of the unit, and flange 22 is provided with a plurality of bolt holes 24 which allow the unit to be mounted on the motor or speed reducer.

The input hub 16 is supported for rotation by a pair of spaced apart clutch bearings 26 and 28. Bearing 26 is located between the input hub 16 and the clutch housing 12 and is retained by a pair of retaining rings 30 and 32 which are fitted in grooves formed in the input hub 16 and clutch housing 12, respectively. The other clutch bearing 28 is fitted between a clutch plate 34 and a piston 36. Retaining rings 38 and 40 are fitted in grooves formed in the clutch plate 34 and piston 36, respectively, and act to retain bearing 28.

Clutch plate 34 is opposed by another clutch plate 42 which is formed as an integral part of the input hub 16. The clutch plates 34 and 42 sandwich between them a clutch disk 44 which is located radially outwardly from the inner end portion of the input hub 16. A plurality of pins 46 connect the clutch plates 34 and 42 together in a manner to effect rotation of the clutch plates together with the input hub 16. At the same time, clutch plate 34 is allowed to slide axially along the pins 46 toward and away from the opposing clutch plate 42. The clutch plates 34 and 42 are larger in diameter than the clutch disk 44 and are considerably larger and more massive than the clutch disk. The pins 46 are located radially outwardly of the clutch disk 44.

The output side of the clutch/brake unit 10 is equipped with a rotary output shaft 48 which is mounted within the brake housing 14. The end of shaft 48 projects out of the housing and is provided with splines 50 which permit a splined connection with the equipment that is driven by the clutch-brake unit 10. Shaft 48 is coaxial with the passage 18 of the input hub 16 and is supported for rotation by a bearing 52. Retainer rings 54 and 56 are fitted in grooves in the brake housing 14 and shaft 48, respectively, in order to retain the bearing 52.

The clutch disk 44 is mounted on the output shaft 48. The clutch disk 44 projects radially outwardly from one end of a cylindrical sleeve or hub 58 which extends around and is connected with the output shaft 48 by splines 60. The opposite faces or sides of the clutch disk 44 are provided with annular friction linings 62 which exhibit high friction characteristics and which are contacted by the clutch plates 34 and 42 when the latter are squeezed together.

Also mounted on the output shaft 48 is a brake disk 64 having its opposite sides or faces provided with friction linings 66. The brake disk 64 projects radially outwardly from one end of the cylindrical hub 58 and thus rotates with shaft 48 due to the splined connection between hub 58 and shaft 48. The provision of the brake disk 64, clutch disk 44 and hub 58 as a single integral rotor is an important feature of the invention. The friction linings 66 are sandwiched between the piston 36 on one side and a stationary brake disk 68 on the other side. The brake disk 68 is formed as an integral part of the brake housing 14.

The piston 36 is a non-rotating part which is connected with the clutch housing 12 by a plurality of pins 70 located outwardly of the pins 46. Another set of pins 72 connect piston 36 with the brake housing 14. Pins 72 are located radially outwardly of the brake disk 64. The pins 70 and 72 are in axial alignment and are oriented parallel to the axis of the clutch/brake unit 10 in order to permit the piston 36 to move back and forth in an axial direction. The pins prevent the piston from rotating. Each pin 70 may be encircled by a small compression spring 74 which acts to continuously urge the piston 36 to the left as viewed in FIG. 1.

It is an important feature of the invention that the housing 11 is enclosed and that the components of the unit are contained in an internal chamber 76 in the housing which is sealed off from the surrounding environment. The clutch/brake unit is thus an enclosed unit which is to be contrasted with an open unit in which the internal components are exposed to the surrounding environment through one or more openings or passages through the housing.

The piston 36 is controlled by pneumatic pressure that may be applied to a clutch inlet port 78 or a brake inlet port 80. Both of the ports 78 and 80 are threaded to receive standard fittings connected with pneumatic lines that receive compressed air from an air compressor or other source. The clutch inlet port 78 connects with an air chamber 82 located on the left side of the piston 36 such that application of pressure to chamber 82 urges the piston to the right. Conversely, the brake inlet port 80 connects with an air chamber 84 located on the right side of the piston, thus urging the piston to the left when air pressure is applied to chamber 84.

An O-ring 86 carried on the periphery of piston 36 seals against the brake housing 14 and thus isolates the two air chambers 82 and 84 from one another. Additional O-rings 88 and 90 seal the piston to the clutch housing 12 and brake housing 14, respectively. Another O-ring 92 seals the clutch housing and brake housing to one another.

In operation of the clutch/brake unit, the input hub 16 is rotated by the drive shaft of an electric motor, speed reducer or other prime mover (not shown). Clutch plate 34 rotates with the input hub 16 due to the pin connections 46.

The clutch of the clutch/brake unit is applied by applying compressed air to the clutch inlet port 78. The air pressure is transmitted to air chamber 82 and acts to force piston 36 to the right. The piston and clutch plate 34 move together, and the clutch disk 44 and its friction linings 62 are thus squeezed between the clutch plates 34 and 42. Since the clutch disk 44 is carried on the output shaft 48, the frictional force results in engagement of the clutch and rotation of the output shaft 48. It is noted that clutch slippage occurs as the output shaft 48 is being accelerated to its operating speed.

The brake is applied by applying compressed air to the brake inlet port 80. The pneumatic pressure is transmitted to the air chamber 84 and thus forces piston 36 to the left. The brake disk 64 and its friction linings 66 are then squeezed between the piston 36 and the brake plate 68 formed as part of the brake housing. Since the brake disk 64 is carried on the output shaft 48, the frictional force that is applied results in braking of the output shaft 48. It is noted that there is some slippage of the brake until the output shaft 48 has been stopped completely.

The use of the single double acting piston 36 eliminates any overlap in the brake and clutch application. When the clutch is applied and piston 36 is moved to the right, the braking force applied to the brake friction linings 66 is relieved as a result of the piston movement. In addition, the force applied by clutch plate 34 to clutch disk 44 provides a positive force which holds the brake disk 64 away from the brake plate 68 in order to preclude braking action. Consequently, when the clutch is applied, the brake is necessarily released. Conversely, when piston 36 is moved to the left to apply the brake, the force applied by plate 34 on the clutch friction linings 62 is relieved and the clutch is automatically released whenever the brake is applied. Additionally, due to the construction of the brake disk 64 and clutch disk 44 as part of a single rotor, the squeezing of the brake disk 64 toward plate 68 forces the clutch disk 44 away from plate 42 to positively release the clutch whenever the brake is applied. This reduces wear on the friction linings of the brake and clutch disks and also avoids the generation of objectionable noise.

The clutch disk 44 and the brake disk 64 are relatively small diameter parts which have a relatively small mass and result in a small inertial effect on the output shaft 48. As a consequence of this small inertia, the output shaft 48 can be accelerated to operating speed with relatively little clutch slippage and can be stopped with relatively little brake slippage. The input hub 16 and the clutch plates 34 and 42 are larger in diameter and much more massive than the clutch or brake disks, and these relatively large and massive parts rotate constantly and are not cyclically rotated and stopped. Therefore, their inertial effects do not adversely influence the ability of the unit to start and stop the output shaft 48. The importance of these inertial influences can be appreciated when it is recognized that the clutch/brake unit 10 is typically used in a cyclical, start-stop process controller which may cycle 30–60 times per minute in many of its applications.

When the clutch is engaged and the output shaft 48 is rotating, there is no rattling of the brake disk 64 as can occur if the brake disk is separate from the clutch disk. Thus, the provision of a single rotor which carries both the brake disk 64 and the clutch disk 44 eliminates a potential source of objectionable noise.

Since the clutch bearings 26 and 28 rotate constantly with the input hub 16, the clutch bearings preferably make use of non-contact seals. With non-contact seals, the heat generated by the bearings is minimized and the unit operates cooler than is the case with other types of bearings. The overall result of the low inertial construction of the clutch/brake unit 10 is that an enclosed housing can be employed because the frictional heat that is generated is small enough to avoid thermal problems that could adversely affect the operation characteristics of the unit. At the same time, both the clutch disk 44 and brake disk 64 are provided with double friction linings in order to provide sufficient torque when the clutch or brake is applied.

FIG. 2 depicts a second embodiment of the clutch-brake unit 110 which differs from the embodiment shown in FIG. 1 only in that the brake is applied by spring force rather than pneumatic pressure. In the embodiment shown in FIG. 2, the same reference numerals are used to identify parts which are substantially the same as those in the FIG. 1 embodiment.

The air applied clutch/spring applied brake unit 110 shown in FIG. 2 is virtually identical in all respects to the air applied clutch/air applied brake unit 10 except that the brake inlet port 80 and air chamber 84 are eliminated and their function is performed by a plurality of compression springs 112. One end of each spring 112 is fitted in a recess 114 formed in the clutch housing 12. The opposite end of each spring is fitted in a recess 116 formed in the piston 36. The springs 112 are preferably spaced equally around the unit. Although the exact number of springs 112 may vary, it is preferred that approximately 16 be used in order to prevent the parts from binding or becoming skewed.

The clutch/brake unit 110 operates in substantially the same manner as unit 10, except that the brake is applied automatically whenever the air pressure is relieved from the clutch inlet port 78. Then, the springs 112 force piston 36 to the left and effect application of the brake. The clutch may be applied by applying air pressure to port 78, thus forcing the piston 36 to the right against the force of the springs 112.

The clutch/brake unit 110 has substantially the same advantages as unit 10. The air applied clutch/air applied brake unit 10 is especially well suited for use in applications where the cycle rates are relatively high and there is a need for controlled clutch and brake application. The air applied clutch/spring applied brake unit 110 is particularly well suited for use in an application involving moderate cycle rates and self energized loads. However, either unit can be used in a wide variety of applications where an enclosed unit is either necessary or desirable.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:
1. A clutch/brake unit comprising:
a closed stationary housing;
an input hub supported in the housing for rotation and adapted to be driven rotatively;
an output shaft supported in the housing for rotation;

a brake disk having opposing surfaces each carrying a friction brake lining thereon;

a clutch disk having opposing surfaces each carrying a friction clutch lining thereon;

a rotor carrying said brake disk and said clutch disk thereon, said rotor having a spline connection with said output shaft to mount said brake disk and clutch disk on the output shaft for rotation therewith;

a double acting piston mounted in said housing for axial movement in opposite first and second directions respectively toward the brake disk and the clutch disk;

said piston acting upon movement thereof in said first direction to effect application of frictional force to both friction brake linings in a manner to frictionally brake the output shaft and said piston acting upon movement thereof in said second direction to effect application of frictional force to both friction clutch linings in a manner to frictionally couple the input hub with the output shaft for driving of the latter;

means for applying fluid pressure to said piston in a manner to move the piston in said second direction; and means for moving said piston in said first direction.

2. The clutch/brake unit of claim 1, including a pair of clutch plates sandwiching said clutch disk therebetween and being squeezed against the friction clutch linings when the piston is moved in said second direction, said clutch plates being mounted for rotation with said input hub.

3. The clutch/brake unit of claim 2, wherein said clutch plates are larger in diameter than said clutch disk and including pin means located radially outwardly of said clutch disk for coupling said clutch plates in a manner allowing relative axial movement therebetween but preventing relative rotation therebetween.

4. The clutch/brake unit of claim 3, including pin means located radially outwardly of said brake disk for coupling said piston with the housing in a manner permitting axial movement of the piston but preventing rotation of the piston relative to the housing.

5. The clutch/brake unit of claim 1, including pin means located radially outwardly of said brake disk for coupling said piston with the housing in a manner permitting axial movement of the piston but preventing rotation of the piston relative to the housing.

6. The clutch/brake unit of claim 1, wherein:
said brake disk is located radially outwardly of said output shaft; and
said clutch disk is located radially outwardly of said input hub.

7. The clutch/brake unit of claim 1, wherein said fluid pressure applying means comprises:
a fluid chamber in said housing adjacent said piston;
a fluid passage in said housing leading to said fluid chamber and adapted to receive fluid under pressure for transmission to said chamber and against the piston.

8. The clutch/brake unit of claim 1, wherein said means for moving said piston in said first direction comprises means for applying fluid under pressure to said piston in a manner to move the piston in said first direction.

9. The clutch/brake unit of claim 1, wherein said means for moving said piston in said first direction comprises spring means.

10. The clutch/brake unit of claim 1, wherein:
said fluid pressure applying means comprises means for applying air under pressure to said piston; and
said means for moving said piston in said first direction comprises means for applying air under pressure to said piston.

11. A dry clutch/brake unit comprising:
a stationary housing presenting an enclosed interior devoid of cooling liquid;
an input hub supported in the housing for rotation and adapted to be driven rotatively;
an output shaft supported in the housing for rotation;
a small diameter brake disk having opposing surfaces each carrying a friction brake lining thereon;
a small diameter clutch disk having opposing surfaces each carrying a friction clutch lining thereon;
a rotor carrying said brake disk and said clutch disk thereon, said rotor having a spline connection with said output shaft to mount said brake disk and clutch disk on the output shaft for rotation therewith;
a pair of clutch plates sandwiching said clutch disk therebetween, said clutch plates being mounted for rotation with said input hub and being located adjacent said friction clutch linings to frictionally couple the clutch disk with the clutch plates when the latter are squeezed together against the friction clutch linings;
pin means located radially outwardly of said clutch disk for coupling said clutch plates in a manner to permit relative axial movement therebetween but not relative rotation;
a double acting piston in said housing mounted therein for axial movement in opposite first and second directions;
said piston acting to squeeze said brake disk and the friction brake linings thereof between the housing and piston when the piston is moved in the first direction;
said piston acting to squeeze said clutch plates together when the piston is moved in the second direction;
pin means located radially outwardly of said brake disk for coupling said housing and piston in a manner to permit relative axial movement therebetween but not relative rotation;
means for applying pneumatic pressure to said piston in a manner to move the piston in said second direction; and
means for moving said piston in said first direction.

12. The clutch/brake unit of claim 11, wherein said pneumatic pressure applying means comprises:
an air chamber in said housing adjacent said piston; and
an air passage in the housing leading to said chamber and adapted to transmit pneumatic pressure thereto and adjacent the piston.

13. The clutch/brake unit of claim 11, wherein said means for moving said piston in said first direction comprises means for applying pneumatic pressure to said piston.

14. The clutch/brake unit of claim 11, wherein said means for moving said piston in said first direction comprises resilient spring means for continuously urging said piston in said first direction.

15. A clutch/brake unit comprising:
a brake housing;

a clutch housing secured to said brake housing and cooperating therewith to provide an enclosed compartment;

an input hub adapted to be driven rotatively;

bearing means in said clutch housing for rotatively supporting said input hub in the clutch housing;

an output shaft;

bearing means in said brake housing for rotatively supporting said output shaft in the brake housing;

a brake disk having opposite surfaces each carrying a friction brake lining thereon;

a clutch disk having opposite surfaces each carrying a friction clutch lining thereon;

a rotor carrying said brake disk and said clutch disk thereon at a location within said compartment, said rotor having a spline connection with said output shaft to mount said brake disk and clutch disk on the output shaft for rotation therewith;

a pair of clutch plates each connected with said input hub at locations within said compartment, said clutch plates sandwiching said clutch disk therebetween and being supported for movement toward and away from one another to respectively squeeze against the clutch linings and release the clutch linings;

a double acting piston mounted in said compartment for axial movement in opposite first and second directions toward the brake disk and the clutch disk, respectively;

said piston acting upon movement in said first direction to squeeze the brake disk and the brake linings thereof between the piston and brake housing to apply a frictional braking force to the output shaft, and said piston acting upon movement in said second direction to squeeze the clutch plates together to frictionally couple the input hub with the output shaft to effect driving of the latter;

means for applying pneumatic pressure to said piston in a manner to move the piston in said second direction; and means for moving said piston in said first direction.

16. The clutch/brake unit of claim 15, wherein said means for moving said piston in said first direction comprises means for applying pneumatic pressure to the piston.

17. The clutch/brake unit of claim 15, wherein said means for moving said piston in said first direction comprises resilient spring means for continuously urging said piston in said first direction.

18. A clutch/brake unit comprising:

a stationary housing;

an input hub supported in the housing for rotation and adapted to be driven rotatively;

an output shaft supported in the housing for rotation concentric to said input hub;

a brake disk having a pair of opposing surfaces each carrying a friction brake lining thereon;

a clutch disk having a pair of opposing surfaces each carrying a friction clutch lining thereon;

a rotor carrying both said brake disk and said clutch disk thereon, said rotor having a spline connection with said output shaft to mount said brake disk and clutch disk on the output shaft for rotation therewith and concentric therewith;

an annular piston concentric with said output shaft and mounted in said housing for axial movement in opposite first and second directions respectively toward the brake disk and the clutch disk;

said piston acting upon movement thereof in said first direction to effect application of frictional force to both friction brake linings in a manner to frictionally brake the output shaft and said piston acting upon movement thereof in said second direction to effect application of frictional force to both friction clutch linings in a manner to frictionally couple the input hub with the output shaft for driving of the latter; and means for selectively moving said piston in said first and second directions.

* * * * *